United States Patent
Wybenga et al.

(10) Patent No.: US 7,558,268 B2
(45) Date of Patent: Jul. 7, 2009

(54) APPARATUS AND METHOD FOR COMBINING FORWARDING TABLES IN A DISTRIBUTED ARCHITECTURE ROUTER

(75) Inventors: Jack C. Wybenga, Plano, TX (US); Pradeep Samudra, Plano, TX (US); Patricia K. Sturm, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1110 days.

(21) Appl. No.: 10/431,770

(22) Filed: May 8, 2003

(65) Prior Publication Data

US 2004/0223502 A1 Nov. 11, 2004

(51) Int. Cl.
*H04L 12/28* (2006.01)
*H04L 12/54* (2006.01)

(52) U.S. Cl. .................................. 370/395.31; 370/428

(58) Field of Classification Search ................ 370/466, 370/355, 389
See application file for complete search history.

(56) References Cited

U.S. PATENT DOCUMENTS

| | | | |
|---|---|---|---|
| 7,440,460 B2* | 10/2008 | Wybenga et al. | 370/395.31 |
| 2001/0046227 A1* | 11/2001 | Matsuhira et al. | 370/355 |
| 2001/0056490 A1* | 12/2001 | Nagami et al. | 709/227 |
| 2002/0126672 A1* | 9/2002 | Chow et al. | 370/392 |
| 2003/0031156 A1* | 2/2003 | Omae et al. | 370/338 |
| 2003/0041163 A1* | 2/2003 | Rhoades et al. | 709/232 |
| 2004/0088574 A1* | 5/2004 | Walter et al. | 713/201 |

* cited by examiner

*Primary Examiner*—Seema S Rao
*Assistant Examiner*—Wanda Z Russell (57) ABSTRACT

A router for transmitting data packets to and receiving data packets from N interfacing peripheral devices. The router comprises a first packet processor that receives a first data packet from a physical medium device (PMD) module coupled to one of the N interfacing peripheral device and determines if a format of the first data packet is one of IPv4, IPv6 and MPLS. The first packet processor determines a destination device of the first data packet by looking up the destination device in a unified forwarding table containing destination devices for data packets in IPv4 format, IPv6 format, and MPLS format.

24 Claims, 5 Drawing Sheets

| |
|---|
| ADDRESS = $2^{32}$ - 1 = 1111 1111 1111 1111 1111 1111 1111 1111 |
| IPv4 ADDRESS SPACE<br>(UPPER 8 BITS = NON-ZERO) — 320 |
| ADDRESS = $2^{24}$ = 0000 0001 0000 0000 0000 0000 0000 0000 |
| ADDRESS = $2^{24}$ - 1 = 0000 0000 1111 1111 1111 1111 1111 1111 |
| RESERVED<br>UPPER 8 BITS = ALL ZEROS — 315 |
| ADDRESS = $2^{21}$ = 0000 0000 0010 0000 0000 0000 0000 0000 |
| ADDRESS = $2^{21}$ - 1 = 0000 0000 0001 1111 1111 1111 1111 1111 |
| IPv6 TAG<br>UPPER 11 BITS = ALL-ZEROS<br>BIT 12 = 1 — 310 |
| ADDRESS = $2^{20}$ = 0000 0000 0001 0000 0000 0000 0000 0000 |
| ADDRESS = $2^{20}$ - 1 = 0000 0000 0000 1111 1111 1111 1111 1111 |
| MPLS LABEL<br>UPPER 12 BITS = ALL ZEROS — 305 |
| ADDRESS = $2^0$ = 0000 0000 0000 0000 0000 0000 0000 0000 |

APPARATUS AND METHOD FOR COMBINING FORWARDING TABLES IN A DISTRIBUTED ARCHITECTURE ROUTER

TECHNICAL FIELD OF THE INVENTION

The present invention is directed, in general, to massively parallel routers and, more specifically, to a distributed architecture router that uses a unified forwarding table and a single forwarding engine to forward different types of data packet traffic.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to subnetworks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers. Thus, routers are increasingly blamed for major bottlenecks in the Internet.

Early routers were implemented on a computer host so that the CPU of the host performed all tasks, such as packet forwarding via a shared bus and routing table computation. This plain architecture proved to be inefficient, due to the concentrated overhead of the CPU and the existence of congestion on the bus. As a result, router vendors developed distributed router architectures that provide efficient packet processing compared to a centralized architecture. In distributed router architectures, many of the functions previously performed by the centralized CPU are distributed to the line cards and a high-speed crossbar switch replaces the shared bus.

When a data packet arrived in the router, a forwarding engine uses the forwarding tables to determine the destination of the data packet. A conventional IP router uses a dedicated forwarding table for each type of traffic (i.e., IPv4, IPv6, MPLS, and the like). However, using a dedicated forwarding table means that a conventional router must manage multiple forwarding tables and requires greater amounts of memory to hold the multiple forwarding tables. As a result, the cost of a conventional router increases due to the additional hardware.

Additionally, a router typically has forwarding engines for each type of traffic. If a single forwarding engine is used, then multiple processes must be used—one process for each traffic type, thus limiting the amount of traffic that can be handled. To avoid this, a conventional router uses multiple forwarding engines (or processes) for each type of traffic. Thus, additionally complexity is added in order to route traffic to the correct forwarding engine.

Furthermore, the prior art methods require more table space, because multiple tables must be constructed—one for each traffic type. Typically, these tables are sparsely occupied, so savings can be achieved by folding them into one table. Although the space for the actual forwarding entry is dynamically allocated, the table search constructs must be replicated for each traffic type. The table search constructs, although smaller per entry than the forwarding table entries, are stored in fast memory, which is expensive. Parts of these tables are statically allocated, rather than dynamically allocated, resulting in replication of some fairly large tables. Additionally, the prior art methods that use separate forwarding engines for each traffic type do not automatically adjust for varying traffic mixes.

Therefore, there is a need in the art for an improved Internet protocol (IP) router. In particular, there is a need for a massively parallel, distributed architecture router that does not require a dedicated forwarding table for each type of Internet Protocol (IP) data traffic. More particularly, there is a need for a router that does not use multiple forwarding engines for multiple IP data traffic types.

SUMMARY OF THE INVENTION

The present invention provides a unified forwarding table that simplifies forwarding table processing and results in a single forwarding process within a single forwarding engine. Thus, the present invention permits Internet Protocol version 4 (IPv4), Internet Protocol version 6 (IPv6), and MultiProtocol Label Switching (MPLS) packets to be forwarded by a single forwarding engine and forwarding process that uses a unified forwarding table. This results in a reduction in the complexity and the cost of forwarding multiple traffic types within a single router. Also, since allocation to processing engines is not based on packet type, the present invention automatically adapts to varying packet type mixtures.

To address the above-discussed deficiencies of the prior art, it is a primary object of the present invention to provide, for use in a communication network, a router capable of transmitting data packets to and receiving data packets from N interfacing peripheral devices. According to an advantageous embodiment of the present invention, the router comprises a first packet processor capable of receiving a first data packet from a physical medium device (PMD) module coupled to one of the N interfacing peripheral devices and determining if a format of the first data packet is one of IPv4, IPv6 and MPLS, wherein the first packet processor determines a destination device of the first data packet by looking up the destination device in a unified forwarding table containing destination devices for data packets in IPv4 format, IPv6 format, and MPLS format.

According to one embodiment of the present invention, the first packet processor, in response to a determination that the first data packet is in IPv4 format, determines the destination device by using a destination address in an IPv4 header of the first data packet to lookup the destination device in the forwarding table.

According to another embodiment of the present invention, the first packet processor forwards the first data packet to a second packet processor in the router using the IPv4 header destination address.

According to still another embodiment of the present invention, the first packet processor, in response to a determination that the first data packet is in IPv6 format, forwards the first data packet to a classification module in the router, wherein the classification module translates a destination address in an IPv6 header of the first data packet to an IPv6 lookup index value and returns the IPv6 lookup index value to the first packet processor.

According to yet another embodiment of the present invention, the first packet processor determines the destination device by using the IPv6 lookup index value to lookup the destination device in the forwarding table.

According to a further embodiment of the present invention, the first packet processor forwards the first data packet to a second packet processor in the router by encapsulating the first data packet in a tunneling packet in IPv4 format.

According to a still further embodiment of the present invention, the first packet processor, in response to a determination that the first data packet is in MPLS format, determines the destination device by using an MPLS label of the first data packet to lookup the destination device in the forwarding table.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged distributed router.

Figure 1:
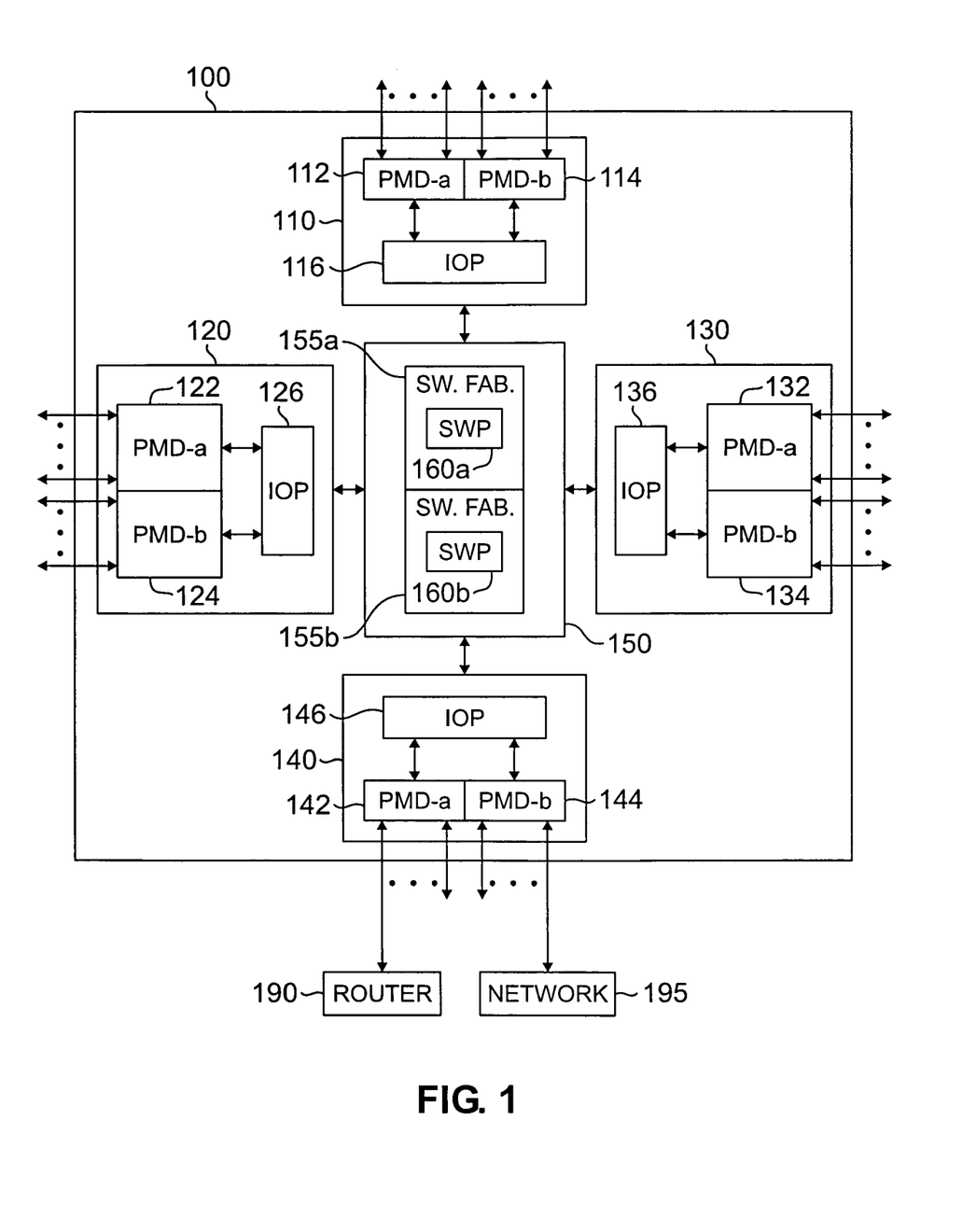
FIG. 1 illustrates a distributed architecture router that implements a unified forwarding table according to the principles of the present invention.

FIG. 1 illustrates exemplary distributed architecture router 100, which implements a unified forwarding table according to the principles of the present invention. Distributed architecture router 100 provides scalability and high-performance using up to N independent routing nodes (RN), including exemplary routing nodes 110, 120, 130 and 140, connected by switch 150, which comprises a pair of high-speed switch fabrics 155a and 155b. Each routing node comprises an input-output processor (IOP) module, and one or more physical medium device (PMD) module. Exemplary RN 110 comprises PMD module 112 (labeled PMD-a), PMD module 114 (labeled PMD-b), and IOP module 116. RN 120 comprises PMD module 122 (labeled PMD-a), PMD module 124 (labeled PMD-b), and IOP module 126. RN 130 comprises PMD module 132 (labeled PMD-a), PMD module 134 (labeled PMD-b), and IOP module 136. Finally, exemplary RN 140 comprises PMD module 142 (labeled PMD-a), PMD module 144 (labeled PMD-b), and IOP module 146.

Each one of IOP module 116, 126, 136 and 146 buffers incoming Internet protocol (IP) packets and MPLS packets from subnets or adjacent routers, such as router 190 and network 195. Additionally, each one of IOP modules 116, 126, 136 and 146 classifies requested services, looks up destination addresses from packet headers, and forwards packets to the outbound IOP module. Moreover, each IOP module also maintains an internal routing table determined from routing protocol packets and provisioned static routes and computes the optimal data paths from the routing table. Each IOP module processes an incoming packet from one of its PMD modules. According to one embodiment of the present invention, each PMD module frames an incoming packet (or cell) from an IP network (or ATM switch) to be processed in an IOP module and performs bus conversion functions.

Each one of routing nodes 110, 120, 130, and 140, configured with an IOP module and PMD module(s) and linked by switch fabrics 155a and 155b, is essentially equivalent to a router by itself. Thus, distributed architecture router 100 can be considered a set of RN building blocks with high-speed links (i.e., switch fabrics 115a and 155b) connected to each block. Switch fabrics 115a and 115b support packet switching between IOP modules. Switch processors, such as exemplary switch processors (SWP) 160a and 160b, located in switch fabrics 155a and 155b, respectively, support system management.

Unlike a traditional router, distributed architecture router 100 requires an efficient mechanism of monitoring the activity (or "aliveness") of each routing node 110, 120, 130, and 140. Distributed architecture router 100 implements a routing coordination protocol (called "loosely-coupled unified environment (LUE) protocol") that enables all of the independent routing nodes to act as a single router by maintaining a consistent link-state database for each routing node. The loosely-unified environment (LUE) protocol is based on the design concept of OSPF (Open Shortest Path First) routing protocol and is executed in parallel by daemons in each one of RN 110, 120, 130, and 140 and in SWP 160a and SWP 160b to select a designated RN among RN 110, 120, 130, and 140 and to synchronize whole routing tables. As is well known, a daemon is an agent program which continuously operates on a processing node and which provides resources to client systems. Daemons are background processes used as utility functions.

Figure 2:
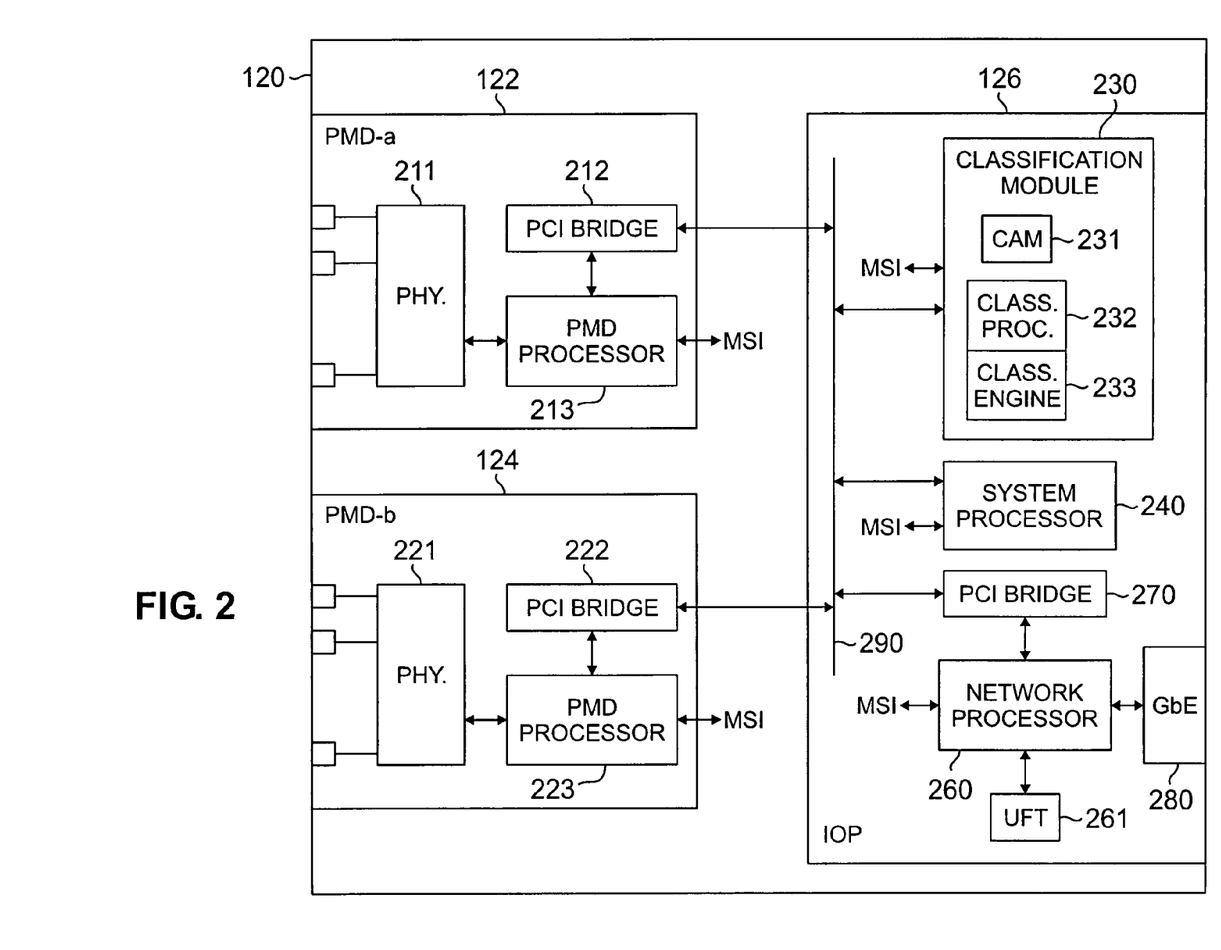
FIG. 2 illustrates selected portions of an exemplary routing node in the distributed architecture router according to one embodiment of the present invention.

FIG. 2 illustrates selected portions of exemplary routing node 120 in distributed architecture router 100 according to one embodiment of the present invention. Routing node 120 comprises physical medium device (PMD) module 122, physical medium device (PMD) module 124 and input-output processor module 126. PMD module 122 (labeled PMD-a) comprises physical layer circuitry 211, physical medium device (PMD) processor 213 (e.g., IXP 1240 processor), and peripheral component interconnect (PCI) bridge 212. PMD module 124 (labeled PMD-b) comprises physical layer circuitry 221, physical medium device (PMD) processor 223 (e.g., IXP 1240 processor), and peripheral component interconnect (PCI) bridge 222.

IOP module 126 comprises classification module 230 (e.g., MPC 8245 processor), system processor 240 (e.g., MPC 8245 processor), network processor 260 (e.g., IXP 1200 or IXP 1240 processor), peripheral component interconnect (PCI) bridge 270, and Gigabit Ethernet connector 280. Classification module 230 comprises content addressable memory (CAM) 231, classification processor 232 (e.g., MPC 8245 processor), and classification engine 233. Classification engine 233 is a state graph processor. PCI bus 290 connects PCI bridges 212, 222 and 270, classification processor 232, and system processor 240. Network processor 260 comprises microengines that perform packet forwarding. Network processor 260 uses unified forwarding table (UFT) 261 to perform forwarding table lookup operations.

The network processor (e.g., network processor 260) in each IOP module (e.g., IOP module 126) performs packet forwarding using a unified forwarding table (e.g., UFT 261). Distributed architecture router 100 unifies the forwarding of IPv4, IPv6, and MPLS packets by combining the forwarding tables for these three packet types, allowing a single forwarding engine and a single forwarding process to be used for all packet types. If throughput demands more processing power, multiple forwarding engines operating in parallel may be used, wherein each of the multiple forwarding engines operates on all data types, thereby allowing automatic adaptation to varying traffic mixes. According to the principles of the present invention, the control plane sets up IPv4 tunnels for the IPv6 and MPLS packets and the data plane forwards the packets within distributed architecture router 100 using the IPv4 tunnels.

Figure 3:
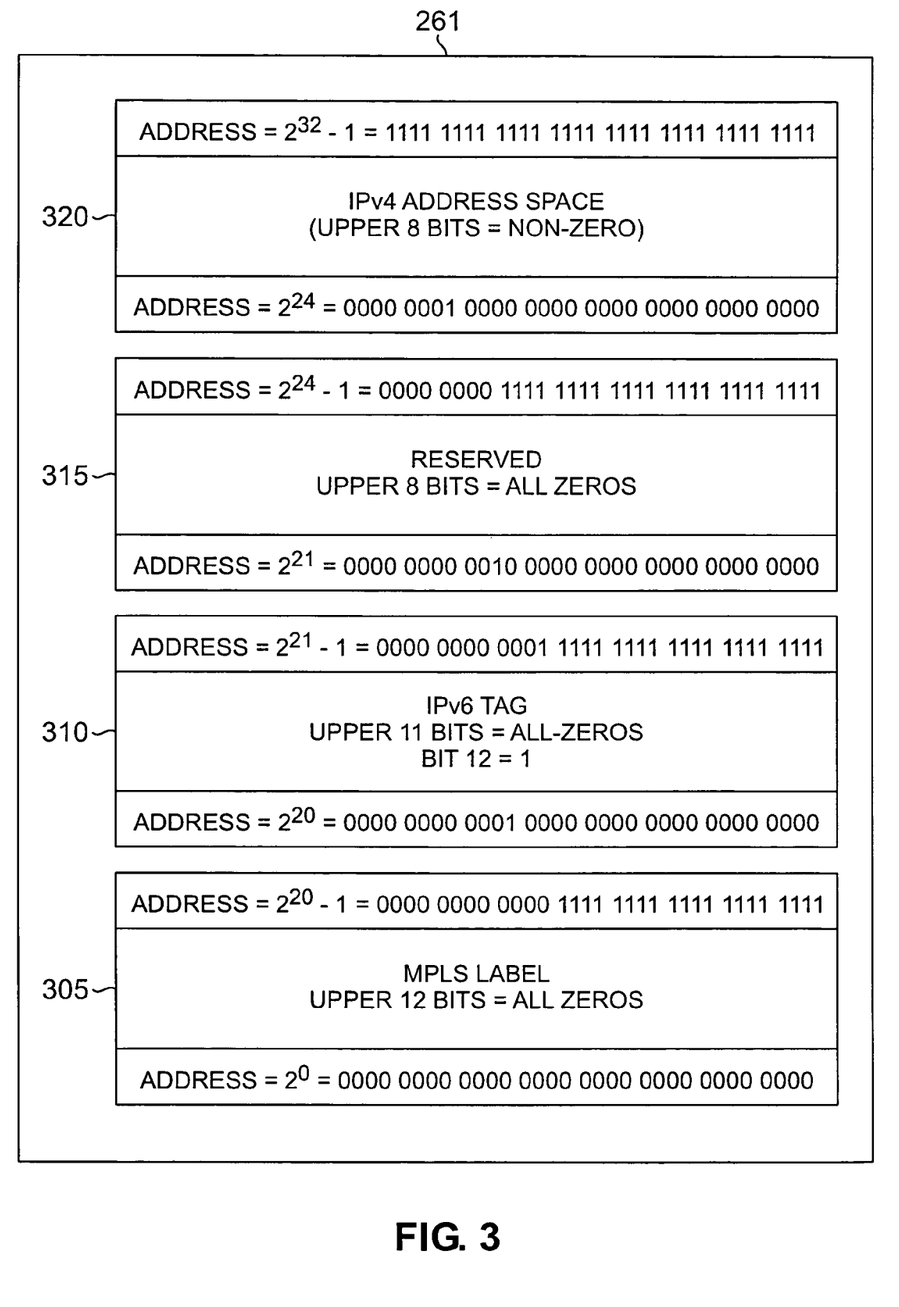
FIG. 3 illustrates exemplary unified forwarding table according to the principles of the present invention.

FIG. 3 illustrates exemplary unified forwarding table 261 according to the principles of the present invention. The unification of IPv4, IPv6, and MPLS forwarding is accomplished using a tunneling technique within distributed architecture router 100. FIG. 3 illustrates the division of the address space used for input in the forwarding engine search.

Unified forwarding table 261 comprises address space 305, address space 310, address space 315, and address space 320. Address space 305 covers the address range from 00000000 (hex) to 000FFFFF (hex), a total of 1,048,576 addresses. Address space 305 is indexed using the MPLS label. Address space 310 covers the address range from 00100000 (hex) to 001FFFFF (hex), a total of 1,048,576 addresses. Address space 310 is indexed using the IPv6 tag. Address space 315 covers the address range from 00200000 (hex) to 00FFFFFF (hex), a total of 14,680,064 addresses. Address space 315 is reserved. Address space 320 covers the address range from 01000000 (hex) to FFFFFFFF (hex), a total of 4,278,190,080 addresses. Address space 320 is indexed using the IPv4 address.

The destination address in the IPv4 header is used directly as the lookup index in address space 320 in unified forwarding table (UFT) 261. IPv4 addresses are identified by at least one of the 8 most significant bits (MSBs) of the address being non-zero. IPv4 addresses therefore occupy the upper portion of the lookup index space for UFT 261. A zero network address is invalid. So, if all of the 8 MSBs of an address are zero, this criterion is used to identify a different packet type. The remaining index space in unified forwarding table 261 is divided between all other packet types.

MPLS labels are 20 bits long and reside between the layer 2 and the layer 3 header. In distributed architecture router 100, the MPLS labels are shifted into the lower 20 bits of the index. Thus, MPLS addresses are identified by the upper 12 bits being zero and reside at the bottom of the lookup index space for UFT 261.

The space between the IPv4 and MPLS indices can be allocated for other traffic types. In FIG. 3, an allocation of approximately 1 million index values are set aside for IPv6 addresses, although this upper boundary is arbitrary. The remaining space is reserved and can be used for other traffic types, including internal routes. IPv6 destination addresses must be translated from the destination address given in the IPv6 header to an index falling within the range of allocated addresses in memory address space 310. This is done using classification engine 233 in combination with content addressable memory (CAM) 231.

Figure 4:
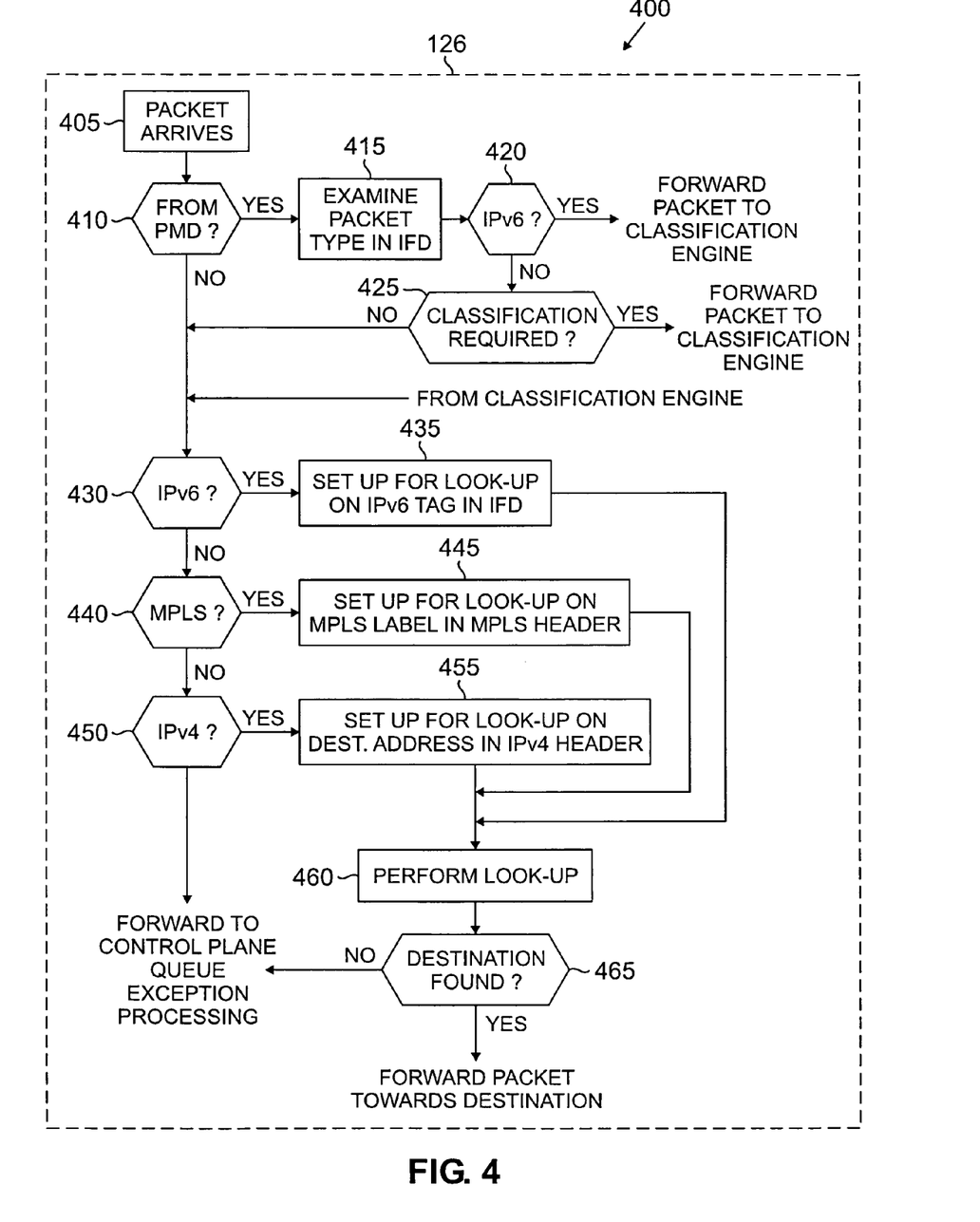
FIG. 4 is a flow diagram illustrating the operation of a forwarding engine in an exemplary IOP according to one embodiment of the present invention.

FIG. 4 is a flow diagram illustrating the operation of a forwarding engine in exemplary IOP module 126 according to one embodiment of the present invention. Data packets may arrive at the microengines of network processor 260 in IOP module 126 from PMD modules 122 and 124 or from switch 150 (process step 405). Initially, network processor 269 determines if a received data packet is from PMD modules 122 or 124 or from switch 150 (process step 410).

If the received packet is from PMD modules 122 or 124, network processor 260 examines the packet type in the interface descriptor (IFD) (process step 415). If the microengine in network processor 260 determines the packet type is IPv6, network processor 260 sends the data packet to classification module 230 for address translation (process step 420). Classification engine (CE) 233 extracts the destination address from the IPv6 header and places the destination address in a Classification Digest. The Classification Digest is presented to content addressable memory (CAM) 231. CAM 231 translates the IPv6 destination address to a forwarding table index, which is returned as the match result. CM 230 places the match result into the packet header. Then the data packet is returned to network processor 260 for forwarding.

If the microengine in network processor 260 determines the packet type is not IPv6, network processor 260 determines whether the packet type is another packet type that requires classification (process step 425). If so, network processor 260 sends the data packet to classification module 230 for address translation as described above.

If the received packet is not from PMD modules 122 or 124 (process step 410), or if the data packet does not require classification (process step 425), or if the data packet is returning from classification module 230, network processor 260 determines if the data packet is an IPv6 packet (process step 430). If the data packet is an IPv6 data packet, then network processor 260 sets up the data packet to use the IPv6 tag to perform a lookup in address space 310 of UFT 261 (process step 435). Network processor 260 then performs the look-up (process step 460) and determines if a destination address has been found (process step 465). If a destination address is found, network processor 260 forwards the packet towards the destination device. If an address is not found, network processor 260 forwards the data packet to the default route, if present, or to the control plane queue for exception processing.

If the data packet is not an IPv6 data packet (process step 430), network processor 260 determines if the data packet is an MPLS packet (process step 440). If the data packet is an MPLS packet, then network processor 260 sets up the data packet to use the MPLS label in the MPLS header to perform a lookup in address space 305 of UFT 261 (process step 445). Network processor 260 then performs the look-up (process step 460) and determines if a destination address has been found (process step 465). If a destination address is found, network processor 260 forwards the packet towards the destination device. If an address is not found, network processor 260 forwards the data packet to the default route, if present, or to the control plane queue for exception processing.

If the data packet is not an MPLS data packet (process step 440), network processor 260 determines if the data packet is an IPv4 packet (process step 450). If the data packet is an IPv4 data packet, then network processor 260 sets up the data packet to use the destination address in the IPv4 header to perform a lookup in address space 320 of UFT 261 (process step 455). Network processor 260 then performs the look-up (process step 460) and determines if a destination address has been found (process step 465). If a destination address is found, network processor 260 forwards the packet towards the destination device. If an address is not found, network processor 260 forwards the data packet to the default route, if present, or to the control plane queue for exception processing.

Figure 5:
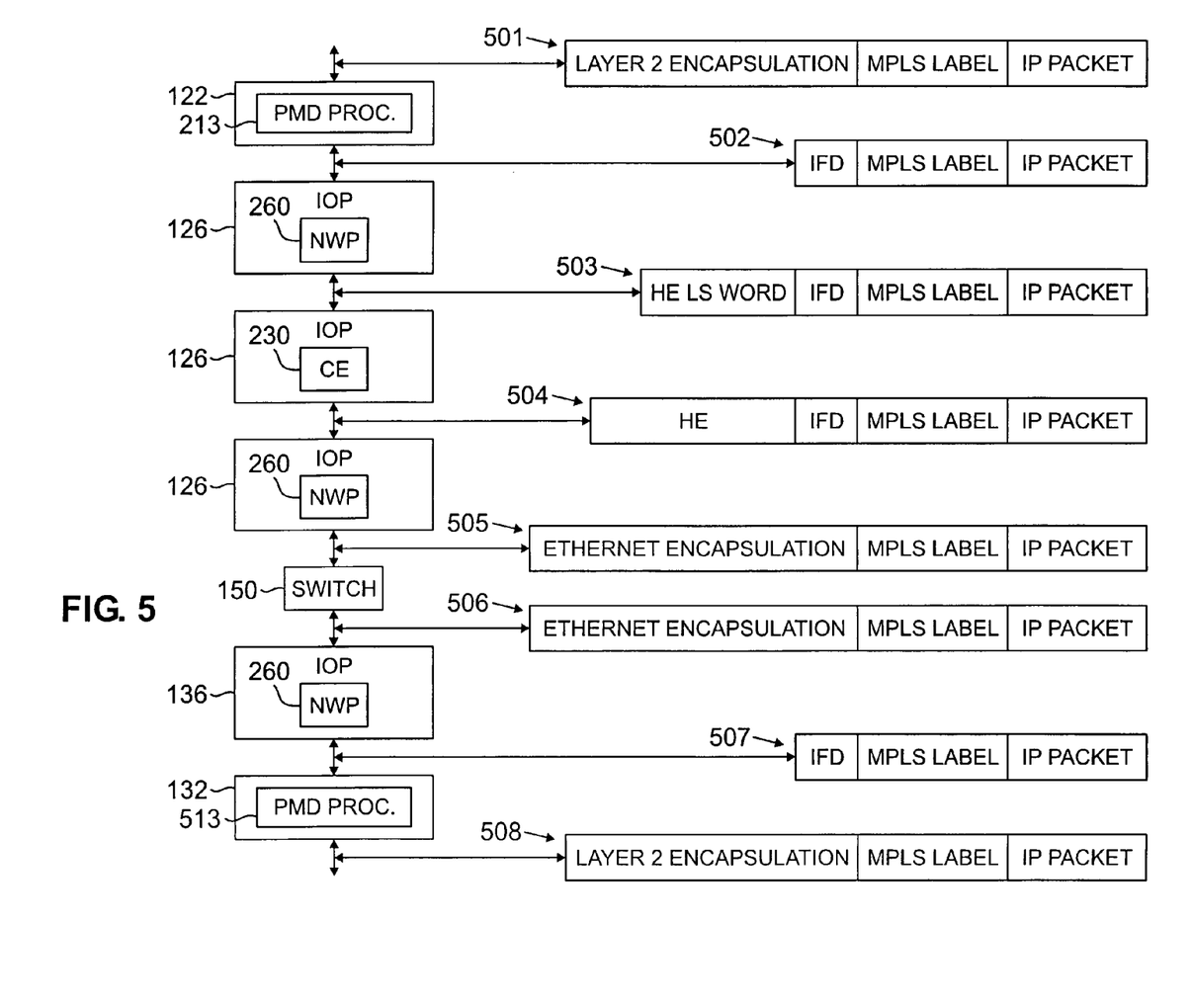
FIG. 5 is a flow diagram illustrating packet format states at various stages in the exemplary distributed architecture router.

FIG. 5 is a flow diagram illustrating packet format states at various stages in exemplary distributed architecture router 100 according to one embodiment of the present invention. Data packets 501-508 illustrate the stage-by-stage progress of a representative data packet. It is noted that an MPLS Label is optionally included in data packets 501-508 for purposes of illustration only. The MPLS Label may not be present with the IPv4 and IPv6 data packets.

Data packet 501 is initially received by PMD module 122 from an external network device. Data packet 501 comprises a Layer 2 Encapsulation field, an MPLS label (optional) and an Internet Protocol (IP) packet. PMD processor 213 in PMD module 122 removes the Layer 2 Encapsulation field and adds an Interface Descriptor (IFD) field to form data packet 502, which PMD module 122 transfers to IOP module 126.

If classification is needed, network processor 260 in IOP module 126 adds a header extension least significant (HE LS) word to the IFD field, the MPLS Label (optional), and the IP packet to form data packet 503, which network processor 260 transfers to classification module 230 in IOP 126. Classification module 230 then adds the rest of the header extension (HE) and fills in the matching address from CAM 231 to form data packet 504, which CM 230 transfers back to network processor 260.

Next, network processor 260 uses the header extension and IFD fields of data packet 504 to look up the destination address in unified forwarding table 261. Once the destination address is determined, network processor 260 formats the packet for the output interface. If the destination address is accessed through a different IOP module, then the header extension and IFD fields are dropped and the Ethernet Encapsulation is added, thereby forming data packet 505, which IOP module 126 transfers to switch 150. If the destination address is part of the same IOP, then the header extension field is dropped and the packet with IFD is sent by IOP module 126 to PMD 122 or PMD 124.

Data packet 505 then passes through switch 150. At the output, switch 150 forwards data packet 506, which is identical to data packet 505, to IOP module 136. Network processor 560 in IOP module 136 is similar to network processor 260. Network processor 560 removes the Ethernet Encapsulation field of data packet 506 and adds an IFD field to form data packet 507, which IOP module 136 transfers to PMD module 132. Finally, PMD processor 513 removes IFD field and adds a Layer 2 Encapsulation field to form data packet 508. PMD module 132 then transmits data packet 508 to an external device in the network.

As explained above, CM 230 translates IPv6 destination addresses to forwarding table lookup indices and the data packet is returned to the micro-engines of network processor 260. The forwarding engine looks at the packet type and pulls the lookup index from the packet header. For IPv4 packets, the destination address given in the IPv4 header is used. For MPLS packets, the MPLS label is used. For IPv6 packets, the IPv6 lookup index returned by the CM 230 in the packet header is used. The destination address used for IPv4 forwarding is in the IPv4 header at the start of the IP packet and the MPLS Label used for MPLS forwarding is located between the Layer 2 and Layer 3 headers.

In essence, MPLS data packets and IPv6 data packets are tunneled within distributed architecture router 100 using the forwarding indices, in some cases determined through classification by classification module 230. The forwarding table lookup is performed on the index. Thus, a single forwarding table may be used for all traffic types. The data packet is forwarded based on the result of the lookup in UFT 261. If the lookup fails, the packet is sent to the default route, if present, or to the control plane for exception handling.

Distributed architecture router 100 learns routes through control plane processing in IOP system Processor 240. Static routes are set up through provisioning and dynamic routes are learned through standard routing protocols, such as RIP, OSPF, and BGP. MPLS routes are statically provisioned or learned through a Label Distribution Protocol (LDP). The Loosely Unified Environment (LUE) process uses the route information to build unified forwarding table 261. Since distributed architecture router 100 is a distributed router, the LUE process must distribute aggregated forwarding tables within the distributed architecture router 100.

Advantageously, the present invention uses a tunneling process to transfer non-IPv4 data packets through router 100. This enables the use of a single forwarding table. UFT 261 unifies all forwarding tables to allow a single forwarding engine and forwarding process to be used for multiple traffic types.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a communication network, a router for transmitting data packets to and receiving data packets from N interfacing peripheral devices, said router comprising:
a first packet processor for receiving a first data packet from a physical medium device (PMD) module coupled to one of said N interfacing peripheral devices and determining if a format of said first data packet is one of IPv4, IPv6 and MPLS, wherein said first packet processor determines a destination device of said first data packet by looking up said destination device in a unified forwarding table containing destination devices at level 2 routing for data packets in IPv4 format, IPv6 format, and MPLS format.

2. The router as set forth in claim 1 wherein said first packet processor, in response to a determination that said first data packet is in IPv4 format, determines said destination device by using a destination address in an IPv4 header of said first data packet to lookup said destination device in said forwarding table.

3. The router as set forth in claim 2 wherein said first packet processor forwards said first data packet to a second packet processor in said router using said IPv4 header destination address.

4. The router as set forth in claim 1 wherein said first packet processor, in response to a determination that said first data packet is in IPv6 format, forwards said first data packet to a classification module in said router, wherein said classification module translates a destination address in an IPv6 header of said first data packet to an IPv6 lookup index value and returns said IPv6 lookup index value to said first packet processor.

5. The router as set forth in claim 4 wherein said first packet processor determines said destination device by using said IPv6 lookup index value to lookup said destination device in said forwarding table.

6. The router as set forth in claim 5 wherein said first packet processor forwards said first data packet to a second packet processor in said router by encapsulating said first data packet in a tunneling packet in IPv4 format.

7. The router as set forth in claim 1 wherein said first packet processor, in response to a determination that said first data packet is in MPLS format, determines said destination device by using a destination address in an MPLS label of said first data packet to lookup said destination device in said forwarding table.

8. The router as set forth in claim 7 wherein said first packet processor forwards said first data packet to a second packet processor in said router by encapsulating said first data packet in a tunneling packet in IPv4 format.

9. A communication network comprising a plurality of routers capable of transmitting data packets to and receiving data packets from each other and from interfacing peripheral devices associated with said communication network, a first one of said plurality of routers comprising:
a first packet processor for receiving a first data packet from a physical medium device (PMD) module coupled to one of said interfacing peripheral devices or a second one of said plurality of routers and determining if a format of said first data packet is one of IPv4, IPv6 and MPLS, wherein said first packet processor determines a destination device of said first data packet by looking up said destination device in a unified forwarding table containing destination devices at level 2 routing for data packets in IPv4 format, IPv6 format, and MPLS format.

10. The communication network as set forth in claim 9 wherein said first packet processor, in response to a determination that said first data packet is in IPv4 format, determines said destination device by using a destination address in an IPv4 header of said first data packet to lookup said destination device in said forwarding table.

11. The communication network as set forth in claim 10 wherein said first packet processor forwards said first data packet to a second packet processor in said router using said IPv4 header destination address.

12. The communication network as set forth in claim 9 wherein said first packet processor, in response to a determination that said first data packet is in IPv6 format, forwards said first data packet to a classification module in said router, wherein said classification module translates a destination address in an IPv6 header of said first data packet to an IPv6 lookup index value and returns said IPv6 lookup index value to said first packet processor.

13. The communication network as set forth in claim 12 wherein said first packet processor determines said destination device by using said IPv6 lookup index value to lookup said destination device in said forwarding table.

14. The communication network as set forth in claim 13 wherein said first packet processor forwards said first data packet to a second packet processor in said router by encapsulating said first data packet in a tunneling packet in IPv4 format.

15. The communication network as set forth in claim 9 wherein said first packet processor, in response to a determination that said first data packet is in MPLS format, determines said destination device by using a destination address in an MPLS label of said first data packet to lookup said destination device in said forwarding table.

16. The communication network as set forth in claim 15 wherein said first packet processor forwards said first data packet to a second packet processor in said router by encapsulating said first data packet in a tunneling packet in IPv4 format.

17. For use in a router comprising a plurality of processors for exchanging data packets with each other over a common bus, a method of forwarding data packets in the router comprising the steps of:
receiving in a first packet processor a first data packet from a physical medium device (PMD) module coupled to one of the N interfacing peripheral devices;
determining in the first packet processor if a format of the first data packet is one of IPv4, IPv6 and MPLS; and
determining in the first packet processor a destination device of the first data packet by looking up the destination device in a unified forwarding table containing destination devices at level 2 routing for data packets in IPv4 format, IPv6 format, and MPLS format.

18. The method as set forth in claim 17 further comprising the step, in response to a determination that the first data packet is in IPv4 format, of determining the destination device by using a destination address in an IPv4 header of the first data packet to lookup the destination device in the forwarding table.

19. The method as set forth in claim 18 further comprising the step of forwarding the first data packet from the first packet processor to a second packet processor in the router using the IPv4 header destination address.

20. The method as set forth in claim 17 further comprising the step, in response to a determination that the first data packet is in IPv6 format, of forwarding the first data packet from the first packet processor to a classification module in the router, wherein the classification module translates a destination address in an IPv6 header of the first data packet to an IPv6 lookup index value and returns the IPv6 lookup index value to the first packet processor.

21. The method as set forth in claim 20 further comprising the step of determining in the first packet processor the destination device by using the IPv6 lookup index value to lookup the destination device in the forwarding table.

22. The method as set forth in claim 21 further comprising the step of forwarding the first data packet from the first packet processor to a second packet processor in the router by encapsulating the first data packet in a tunneling packet in IPv4 format.

23. The method as set forth in claim 17 further comprising the step, in response to a determination that the first data packet is in MPLS format, of determining the destination device by using a destination address in an MPLS label of the first data packet to lookup the destination device in the forwarding table.

24. The method as set forth in claim 23 further comprising the step of forwarding the first data packet from the first packet processor to a second packet processor in the router by encapsulating the first data packet in a tunneling packet in IPv4 format.

* * * * *